United States Patent Office 3,672,889
Patented June 27, 1972

3,672,889
ACRYLATE TERPOLYMER RESIN BINDERS FOR PHOTOELECTROSTATIC MEMBERS
Evan S. Baltazzi, Brookfield, Robert G. Blanchette, Elk Grove Village, and Ralph L. Minnis, Des Plaines, Ill., assignors to Addressograph-Multigraph Corporation, Mount Prospect, Ill.
No Drawing. Filed July 14, 1969, Ser. No. 841,545
Int. Cl. G03g 5/08
U.S. Cl. 96—1.8
5 Claims

ABSTRACT OF THE DISCLOSURE

A polymeric resin binder for zinc oxide which is a terpolymer formed of ethyl acrylate or ethyl methacrylate, a vinyl-aryl compound such as styrene and an acrylate having amino, hydroxy, or acid functional groups. A typical terpolymer is ethyl acrylate-styrene-hydroxyethyl methacrylate combined in the weight ratio of 69:23:8.

BACKGROUND OF THE INVENTION

This invention relates to improved resin binders for photoconductive pigments and more particularly, to terpolymers formed of moieties which contribute desirable properties to the photoconductive insulating material.

The role of the resin binder is extremely important in achieving optimum performance from photoelectrostatic coatings. Such properties as saturation charge level, dark decay characteristics and light decay characteristics have been found to be influenced by the functional components in the polymeric materials.

BRIEF DESCRIPTION OF THE INVENTION

In accordance with this invention it has been found that photoelectrostatic materials of the type in which a conducting base support is applied a thin coating of a photoconductive pigment dispersed in a resin binder which is a terpolymer formed of an acrylic ester having the following general formula:

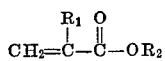

where $R_1$ is hydrogen or methyl and $R_2$ is lower alkyl, a vinyl aromatic component, and an acrylic component having the general formula:

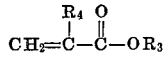

in which $R_3$ is lower alkyl, lower hydroxy alkyl, lower dialkyl amino or hydrogen, $R_4$ is hydrogen or methyl, impart unique properties to the photoelectrostatic member.

Some of the properties which these terpolymers provide are: slow dark decay rates, improved light sensitivity, good adhesion properties, and improved optical density in the images. A slow dark decay rate is desirable in order to prove the necessary time after charging the electrostatic member to advance it to the exposure station. The light sensitivity is defined in terms of the average voltage drop in seconds which is important to permit lower exposure time and for lower voltage illuminating sources. Print quality in the form of sharp dense images is highly desirable. Finally, the resin binder should have good adherance to the base support or otherwise the photoconductive coating will peel off.

The resin binder of this invention when incorporated with zinc oxide photoconductive system result in improved lithographic plates. It is known that zinc-oxide resin binders can be converted to lithographic plates by selectively converting the non-image portions of the zinc oxide resin binder surface to be water receptive. The terpolymers of this invention lend themselves to be rapidly converted to water receptivity by using rather mild treating solution such as ordinary phosphate solutions.

It is a general object of this invention to provide photoelectrostatic members having improved properties, particularly with respect to light sensitivity speed, saturation voltage, dark voltage retention and image density.

It is a specific object to provide an improved photoelectrostatic member through the use of a novel resin binder which is an acrylic terpolymer of an alkyl acrylate, a vinyl aromatic moiety and an alkyl acrylate having amino, hydroxy, or acid functional groups.

DETAILED DESCRIPTION

The photoelectrostatic member of this invention comprises a base or substrate which is electrically conducting having a resistivity in the range of from $10^6$ to $10^{12}$ ohm-centimeters and preferably in the range of $10^8$ to $10^{10}$ ohm-centimeters. The substrate or base can be formed of metals such as aluminum, copper, steel or metal foils such as aluminum and tin, and of paper, plastic, cloth and other materials having the proper electrical resistivity.

In the production of photoelectrostatic members or materials, the surface of the substrate or base is applied thereto a thin film, layer or coating of a suspension of finely divided particles of photoconductive insulating material and the acrylic terpolymer resin binder in an organic solvent. The resulting product is a photoelectrostatic member which can be used in photoelectrostatic processes as described above.

The photoconductive insulating materials can be any of the well known materials such as vitreous selenium, sulfur, oxides of zinc, aluminum, titanium, lead, antimony, bismuth, cadmium, mercury, molybdenum, and copper and the selenides and tellurides of these metals. Other inorganic materials such as zinc titanate, arsenic bisulfide, lead chromate and cadmium arsenide can be used.

The amount of photoconductive insulating material suspended in the acrylic terpolymer resin binder can be varied over relatively wide ranges. One part by weight of this resin binder can be combined with as little as one part by weight of photoconductive insulating material or with as many as 50 parts by weight of photoconductive insulating material. Preferably, 6 to 30 parts of photoconductive insulating material per part of resin binder is employed. The resin binder of the present invention is made by the interaction of an alkyl acrylate with a primary, secondary or tertiary amino acrylic esters, hydroxy alkyl acrylic ester or acrylic or methacrylic acid and a vinyl aromatic monomer, such as for example, styrene, vinyl toluene, or α-methyl styrene.

The technique of free radical solution polymerization is employed in the preparation of the polymers of the instant invention. The various monomeric materials are combined in the proper weight ratio range and dissolved in xylene or toluene. The weight range of the various reactants in parts per weight of the total weight of solids is alkyl acrylates 40 to 70, vinyl aromatic component 20 to 30 parts and the amino acrylic esters, hydroxy alkyl acrylic ester or acrylic or methacrylic acid component 1 to 20 parts. The amount of solvent employed is at least equal to the total weight of the solids which represents a 50% solution and the amount of solvent can comprise up to 60% by weight of the total solution of the solids. It will be appreciated that the amount of solvent is not critical. In view of the fact that the contents of the reaction mixture will be used as a solution when preparing the photoconductive coating an amount of solvent is employed compatible to the required viscosity for coating on conventional equipment of a 30 to 1 pigment to binder ratio. Usually additional amounts of solvent are required to further dilute the resin binder solution.

Example I

Weighed amounts of ethyl acrylate, styrene, and dimethylaminoethyl methacrylate were dissolved in 100 grams of xylene. Included in the solution were 1 gram of benzoyl peroxide and 1 gram of t-butylhydroperoxide which are free radical initiators. A three-necked flask equipped with a stirring device was charged with 233 grams of xylene and heated. As the xylene reached refluxing temperatures the solution of the monomeric components was slowly added to the refluxing xylene while stirring, so that the monomers and initiators were added over a one hour period.

The solution was heated under reflux for an additional 3½ hours and the polymer held in solution.

To test for the extent of polymerization a measured quantity of the solution was taken down to dryness in an evaporation oven held at a constant temperature of 110° C. Any unreacted monomeric materials evaporated with the solvent leaving behind the formed terpolymer providing a gravimetric measure of the extent of polymerization.

Under the aforedescribed general preparation there resulted at least a 90% to 98% solid residue after evaporating the solvent portion which is evidence that the polymerization reaction was substantially complete with extremely small amounts of monomer remaining unreacted.

The structure of the polymeric material may theoretically be represented as follows:

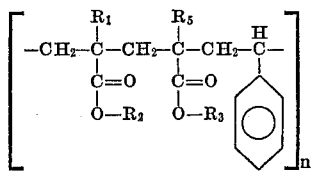

However, it is known that the vinyl-aryl groups may preferentially polymerize with each other as do the alkyl acrylates so that the above formula may have alternative forms in which the monomers appear with greater frequency in a particular unit $n$.

The photoelectrostatic member is prepared by dispensing 30 parts by weight of zinc oxide such as American Zinc Company ZZZ-61 photoconductive grade zinc oxide in a solution containing one part by weight of terpolymer to 60 parts toluene. The mixture is ball milled until the zinc oxide was well dispersed in the solution of tthe resin. A solution of 0.03 part of casein yellow and 0.04 part alphazurine in 15 parts of methanol was added to the pigment resin solvent. The resulting coating mixture was applied to a conductively treated paper, 60 pounds basic weight (25" by 38"—500 sheets) at a rate of 15 pounds per 3000 square feet dry coverage. The excess solvent was evaporated by hot forced air drying and a flexible film formed.

Using the terpolymer of the instant invention the range of electrical properties of the coated paper were as follows:

Saturation voltage ($V_0$)—160 to 670
Dark decay in volts per second ($Y'_d$)—5 to 8
Light decay in volts per foot candle second ($Y'_1$)—50 to 200
Speed (foot candle seconds)$^{-1}$ (S)—.13 to 1.19
Resistivity ($r$)—$10^{13}$ to $10^{16}$ ohm.cm.

The terms "saturation voltage," "speed," "light sensitivity," and "dark decay," wherever used in the description of this invention will be understood to have the following definitions:

Saturation voltage ($V_0$)—the maximum voltage obtainable on a photoconductive surface which has been dark adapted.
Dark decay ($Y'_d$)—the average rate of voltage drop in a dark environment in units of volts per second.
Light sensitivity ($Y'_1$)—the average rate of voltage drop upon light exposure in units of volts per foot-candle second.
Speed (S)—the ratio of the rate of voltage upon light exposure to the saturation voltage in units of reciprocal foot candle seconds.
Resistivity in ohm.cm.—the product of the resistivity $\rho$ and the dielectric constant $k$.

Photoelectrostatic members were prepared following the general description of Example 1 using different terpolymers in each case. The following are examples of such terpolymers that were used to prepare different photoelectrostatic members.

Example II 69/23/8

| | G. |
|---|---|
| Ethyl acrylate | 345 |
| Styrene | 115 |
| Dimethylaminoethyl methacrylate | 40 |
| Benzoyl peroxide | 5 |
| t-Butylhydroperoxide | 5 |
| Xylene | 333 |

Example III 69/23/8

| | G. |
|---|---|
| Ethyl acrylate | 138 |
| Styrene | 46 |
| Dimethylamino ethyl methacrylate | 16 |
| Azobisdiisobutyronitrite | 2 |
| Benzene | 200 |

Example IV 69/23/8

| | G. |
|---|---|
| Ethyl acrylate | 138 |
| Styrene | 46 |
| Methylamino ethyl acrylate | 16 |
| Azobisdiisobutyronitrite | 2 |
| Benzene | 200 |

Example V 69/23/8

| | G. |
|---|---|
| Ethyl acrylate | 345 |
| Styrene | 115 |
| Ethylamino ethyl methacrylate | 40 |
| Benzoyl peroxide | 31 |
| Xylene | 333 |

Example VI 69/23/8

| | G. |
|---|---|
| Ethyl acrylate | 172.50 |
| Styrene | 57.50 |
| Diethylamino ethyl methacrylate | 20.00 |
| Azobisdiisobutyronitrite | 0.25 |
| Benzene | 330 |

Example VII 50/42/8

| | G. |
|---|---|
| Ethyl acrylate | 100 |
| Styrene | 84 |
| t-Butylamino ethyl methacrylate | 16 |
| Benzoyl peroxide | 1 |
| t-Butylhydroperoxide | 1 |
| Benzene | 200 |

Example VIII 60/32/8

| | G. |
|---|---|
| Ethyl acrylate | 120 |
| Styrene | 64 |
| t-Butylamino ethyl methacrylate | 16 |
| Azobisdiisobutyronitrite | 2 |
| Benzene | 200 |

Example IX 45/38/17

| | G. |
|---|---|
| Ethyl acrylate | 90 |
| Styrene | 76 |
| t-Butylamino ethyl methacrylate | 34 |
| Azobisdiisobutyronitrite | 2 |
| Benzene | 200 |

Example X 69/23/8

|  | G. |
|---|---|
| Ethyl acrylate | 345 |
| Styrene | 115 |
| Glacial acrylic acid | 40 |
| Benzene peroxide | 5 |
| t-Butylhydroperoxide | 5 |
| Xylene | 300 |

Example XI 69/23/8

|  | G. |
|---|---|
| Ethyl acrylate | 138 |
| Styrene | 46 |
| Methacrylic acid | 16 |
| Azobisdiisobutyronitrite | 2 |
| Benzene | 200 |

Example XII 22/70/8

|  | G. |
|---|---|
| Ethyl acrylate | 140 |
| Vinyl toluene | 46 |
| Hydroxy ethyl methacrylate | 16 |
| Azobisdiisobutyronitrite | 2 |
| Benzene | 200 |

Example XIII 42/50/8

|  | G. |
|---|---|
| Ethyl acrylate | 84 |
| Vinyl toluene | 100 |
| Hydroxy ethyl methacrylate | 16 |
| Azobisdiisobutyronitrite | 2 |
| Benzene | 200 |

Example XIV 69/30/8

|  | G. |
|---|---|
| Ethyl acrylate | 138 |
| Vinyl toluene | 46 |
| Hydroxy ethyl methacrylate | 16 |
| Azobisdiisobutyronitrite | 2 |
| Benzene | 200 |

Example XV 69/23/8

|  | G. |
|---|---|
| Ethyl acrylate | 138 |
| Styrene | 46 |
| Hydroxy propylmethacrylate | 16 |
| Azobisdiisobutyronitrite | 2 |
| Benzene | 200 |

Example XVI 69/23/8

|  | G. |
|---|---|
| Ethyl acrylate | 138 |
| α-Methyl styrene | 46 |
| Azobisdiisobutyronitrite | 2 |
| Hydroxy ethyl methacrylate | 16 |
| Benzene | 200 |

In each of the preceding examples successful binders result when methyl acrylate, methyl methacrylate or ethyl methacrylate was substituted for the ethyl acrylate.

The following table lists the electrical properties of each of the photoelectrostatic members prepared with resin binder of the particular example.

It was found that the value for $Y'_d$ the dark decay rate should be less than 10 and preferably in the range of 2–5. As the value exceeds 10 volts per second it becomes increasingly difficult for the photoconductive member to accept and hold a charge. The problem manifests itself in the member losing its charge almost immediately upon removing it from the charging unit.

The resistivity must be greater than $10^{13}$ ohm cm. The range being between $10^{13}$ and $10^{15}$ ohm cm. While a photoelectrostatic member must have a resistivity greater than $10^{13}$ it will not be operable if for example, $Y'_d$ is greater than 10 volts per second.

The greater the saturation voltage the more dense the image and greater the contrast value of the member. As the $V_0$ reaches lower levels of 200 volts the image density will tend to be weak, at 100 volts it is poor and unacceptable.

The light decay rate should desirably be 100 volts per foot candle second or greater. However, photoelectrostatic members with $Y_l$ values in the range of 75 are operable.

When the speed values are below 0.1 the photoelectrostatic member is quite slow. For most application a minimum value of 0.15 is required. Values in the 0.3 range are good and the value exceeds 0.5 the speed can be rated as excellent.

Accordingly it will be seen that each of the resin binders resulted in photoelectrostatic members having two or more of its electrical characteristics in the good to excellent range.

In the circumstances the copolymer was used such as ethyl acrylate:styrene the electrical properties were poor and generally outside the limits of operability in the environment of a zinc oxide photoelectrostatic member.

| Example No. | Saturation voltage | Dark decay rate | Light decay rate | Speed | Resistivity |
|---|---|---|---|---|---|
| 2 | 400 | 5.0 | 65 | .125 | 7×10¹³ |
| 3 | 1,000 | 9.0 | 256 | .61 | 7×10¹³ |
| 4 | 520 | 5 | 153 | .30 | 6×10¹³ |
| 5 | 360 | 3 | 124 | .31 | 7×10¹⁴ |
| 6 | 480 | 7 | 160 | .33 | 1×10¹⁴ |
| 7 | 160 | 7 | 190 | 1.19 | 3×10¹⁵ |
| 8 | 390 | 7 | 160 | .41 | 5×10¹⁵ |
| 9 | 390 | 7 | 180 | .46 | 7×10¹⁵ |
| 10 | 550 | 1 | 40 | .06 | 4×10¹⁶ |
| 11 | 570 | 2 | 88 | .15 | 2×10¹⁵ |
| 12 | 250 | 9 | 133 | .53 | 1×10¹⁶ |
| 13 | 390 | 10 | 135 | .35 | 8×10¹⁵ |
| 14 | 620 | 9 | 103 | .17 | 1×10¹⁴ |
| 15 | 500 | 7 | 68 | .14 | 2×10¹⁴ |
| 16 | 440 | 5 | 160 | .36 | 4×10¹⁴ |

What is claimed is:

1. A photoelectrostatic member comprising a conductive substrate having applied thereon a coating comprising photoconductive zinc oxide dispersed in a resin binder, said resin binder comprising a terpolymer produced by reacting:

an acrylic ester monomer in the range of 50 to 70 parts by weight of the terpolymer having the following formula:

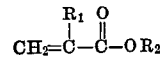

where $R_1$ is hydrogen or methyl and $R_2$ is lower alkyl,
a vinyl aryl monomer in the range of 20 to 30 parts by weight of the terpolymer selected from the group consisting of styrene, α-methyl styrene and vinyl toluene, and
a monomer in the range of 1 to 20 parts by weight of a terpolymer having the formula:

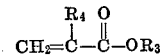

in which $R_3$ is lower dialkyl amino and $R_4$ is hydrogen or methyl.

2. The photoelectrostatic member as claimed in claim 1 wherein the terpolymer is ethyl acrylate:styrene:dimethylamino ethyl methacrylate.

3. The photoelectrostatic member as claimed in claim 1 wherein the terpolymer is ethyl acrylate:styrene:dimethylaminoethyl acrylate.

4. The photoelectrostatic member as claimed in claim 1 wherein the terpolymer is ethyl acrylate:styrene:diethylaminoethyl methacrylate.

5. The photoelectrostatic member as claimed in claim 1 wherein the terpolymer is ethyl acrylate:styrene:t-butylaminoethyl methacrylate.

References Cited
UNITED STATES PATENTS

| | | | |
|---|---|---|---|
| 3,068,183 | 12/1962 | Strolle | 260—80.8 X |
| 3,197,307 | 7/1965 | Blake et al. | 96—1.8 |
| 3,244,655 | 4/1966 | Sullivan et al. | 260—80.8 X |
| 3,297,614 | 1/1967 | Pueschner et al. | 260—80.8 X |
| 3,389,110 | 6/1968 | Taft | 260—80.73 X |
| 3,401,037 | 9/1968 | Roteman et al. | 96—1 |
| 3,513,120 | 5/1970 | Pohlemann et al. | 260—80.73 X |
| 3,515,550 | 6/1970 | Heidecker et al. | 96—1.8 |
| 3,481,735 | 12/1969 | Graver et al. | 96—1.5 |
| 3,554,747 | 1/1971 | Dastoor | 96—1.8 |

FOREIGN PATENTS

| | | | |
|---|---|---|---|
| 805,616 | 2/1969 | Canada | 96—1.8 |

CHARLES E. VAN HORN, Primary Examiner

U.S. Cl. X.R.

260—80.73, 80.75, 80.81; 252—501